United States Patent
Berger et al.

(10) Patent No.: US 6,389,802 B1
(45) Date of Patent: May 21, 2002

(54) METHOD AND ARRANGEMENT FOR OPERATING AN INTERNAL COMBUSTION ENGINE IN COMBINATION WITH AN NOX STORAGE CATALYTIC CONVERTER AND AN NOX SENSOR

(75) Inventors: Joachim Berger, Winterbach; Rene Schenk, Tamm; Andreas Blumenstock, Ludwigsburg; Klaus Winkler, Rutesheim, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/404,158

(22) Filed: Sep. 27, 1999

(30) Foreign Application Priority Data

Sep. 25, 1998 (DE) .......................................... 198 43 879

(51) Int. Cl.$^7$ ................................................ F01N 3/00
(52) U.S. Cl. ............................ 60/274; 60/277; 60/285; 60/276
(58) Field of Search .......................... 60/274, 276, 277, 60/285, 297

(56) References Cited

U.S. PATENT DOCUMENTS

| | | | |
|---|---|---|---|
| 5,157,921 A | * | 10/1992 | Ito et al. ........................ 60/274 |
| 5,341,643 A | * | 8/1994 | Hamburg et al. ............. 60/276 |
| 5,410,873 A | * | 5/1995 | Tashiro ......................... 60/276 |
| 5,473,887 A | | 12/1995 | Takeshima et al. |
| 5,713,199 A | * | 2/1998 | Takeshima et al. ........... 60/276 |
| 5,953,907 A | * | 9/1999 | Kato et al. ..................... 60/274 |
| 6,026,640 A | * | 2/2000 | Kato et al. ..................... 60/274 |
| 6,161,377 A | * | 12/2000 | Boegner et al. ............... 60/274 |
| 6,167,695 B1 | * | 1/2001 | Itou et al. ...................... 60/274 |

OTHER PUBLICATIONS

"Thick Film ZrO2 NOx Sensor" by N. Kato et al, SAE Technical Paper Series 960334.

* cited by examiner

Primary Examiner—Thomas Denion
Assistant Examiner—Binh Tran
(74) Attorney, Agent, or Firm—Walter Ottesen

(57) ABSTRACT

The invention is directed to a control of an air/fuel ratio during operation of an internal combustion engine having a catalytic converter and an NOx sensor mounted behind the catalytic converter as seen in flow direction. The engine is operated alternately in a first phase with a mixture which is deficient in fuel compared to the stoichiometric mixture composition and, in a second phase, with a stoichiometric or rich mixture composition. The triggering of the change between the two phases is influenced by the signal of the NOx sensor.

2 Claims, 5 Drawing Sheets

US 6,389,802 B1

METHOD AND ARRANGEMENT FOR OPERATING AN INTERNAL COMBUSTION ENGINE IN COMBINATION WITH AN NOX STORAGE CATALYTIC CONVERTER AND AN NOX SENSOR

BACKGROUND OF THE INVENTION

The invention relates to the operation of an internal combustion engine in combination with an NOx storage catalytic converter and an NOx sensor which is mounted in the flow direction behind the catalytic converter. The three-way catalytic converter no longer satisfies the requirements as to exhaust-gas quality in the area of combustion with a lean air/fuel mixture ($\lambda$>1). Here, NOx storage catalytic converters are used for gasoline engines as well as for diesel engines. These catalytic converters store nitrous oxide which is emitted in lean engine operation. Stored nitrates are released and reduced to nitrogen by the operation of the engine in the rich region ($\lambda$<1).

Ideally, the engine is driven lean in a first phase until the NOx storage catalytic converter is full; that is, until the catalytic converter can no longer store any further nitrous oxide. Thereafter, and in an ideal manner, a second phase follows having a rich operation for that time span which is needed for the regeneration of the NOx storage catalytic converter. The storage capability of the NOx catalytic converter in the lean operating region is dependent upon charge and drops continuously. If the first phase lasts too long, then unwanted nitrous oxide emissions occur. A second phase which takes too long has the consequence of increased HC and CO emissions. Accordingly, the problem is present that the change between the two phases is so undertaken that neither increased NOx emissions nor HC emissions occur.

In this connection, it is known from U.S. Pat. No. 5,473,887 to estimate the NOx quantity, which is stored in a first phase, by a summed engine rpm and to then change into the second phase when the summed engine rpm exceeds a predetermined threshold value. The stored quantity is thereby modeled. Its actual value is not detected. The modeling can simulate the actually stored quantity only incompletely. For this reason, the first phase is either too long or too short with the above-mentioned disadvantageous consequences for the quality of the exhaust gas.

U.S. patent application Ser. No. 08/254,603, filed on Aug. 12, 1997, (PCT/DE 97/01714) discloses an NOx sensor for monitoring an NOx storage catalytic converter and for measuring its actual level of charge which makes possible a quasi-linear control for the storage of NOx. When the measurement of the actual storage charge level indicates an exhaustion of the storage capacity, a rich pulse is generated, that is, an operation of the engine with a rich mixture for regenerating the storage catalytic converter. SAE technical paper 960334 discloses an NOx sensor having an approximately linear signal characteristic.

SUMMARY OF THE INVENTION

It is an object of the invention to provide a control of the regeneration of a storage catalytic converter with the aid of an NOx sensor which comes closer to the ideal of an optimal usage of the NOx storage capability by a complete filling and discharging of the storage catalytic converter while simultaneously reducing the unwanted HC and CO emissions.

Here, the start, the duration and the height of the rich pulse are to be optimized. A rich pulse which is too long increases the HC and CO emissions. A rich pulse which is too short effects an incomplete emptying of the store which leads away from the objective of a storage phase as long as possible with fuel-economic lean engine operation.

The method of the invention is for changing the mixture composition of the exhaust gas supplied from a combustion process to an NOx storage. The method includes the steps of: providing an NOx sensor mounted rearward of the NOx storage viewed in flow direction; changing the exhaust gas composition in a first phase so as to cause the exhaust gas to contain more NOx than in a second phase; changing the exhaust gas composition in the second phase so as to cause the exhaust gas to contain a reducing agent; and, changing over from the first phase to the second phase when one of the following conditions is satisfied: the signal of the NOx sensor reaches a first threshold value (UT) which indicates a filled NOx storage; or, a signal formed by considering the signal of the NOx sensor reaches a first threshold value (UT) which indicates a filled NOx storage.

The control of the air/fuel ratio during operation of an internal combustion engine having a catalytic converter and an exhaust-gas sensor takes place in such a manner that a lean operation and a rich operation of the engine are ultimately controlled. The exhaust-gas sensor is sensitive for nitrous oxide and is mounted rearward of the catalytic converter in flow direction. The engine is driven with a lean mixture in time average.

The change between both phases is controlled by the NOx sensor signal in a first embodiment. The NOx sensor detects the NOx concentration in the exhaust gas. If this concentration exceeds a predetermined threshold, the storage regeneration is triggered by the mixture enrichment.

In a second embodiment, a change takes place on the basis of the NOx mass flow rearward of the NOx storage catalytic converter. The NOx mass flow can be determined from the NOx sensor signal and the exhaust-gas mass. The exhaust-gas mass can be computed from the intake air quantity ml and the fuel mass.

In both embodiments, a disturbed sensor signal can lead to an unwanted exceeding of the threshold value. An unwanted exceeding of the threshold value occurs when the sensor signal indicates a higher NOx concentration than is actually present. To avoid an unwanted change, the triggering of the mixture enrichment takes place when the time integral of the NOx concentration or of the NOx mass flow exceeds a predetermined threshold value. The integral formation affords the advantage of an independence from the operating point of the engine because, when forming the integral, the air mass ml, which is inducted by the engine, goes into the formation of the integral. The air mass ml participates in the determination of the exhaust-gas mass flow. A further advantage compared to a triggering of the regeneration by the instantaneous values of the NOx concentration or NOx mass flow lies in a greater insensitivity with respect to sensor disturbance influences.

In the context of a further embodiment, an enrichment of the mixture takes place when the level of conversion of the NOx storage catalytic converter drops below a predetermined threshold. This method affords the advantage that it is especially referred to the NOx storage catalytic converter because of the formation of the conversion.

The duration of the regeneration is advantageously so computed as a function of the supplied quantity of the reducing agent and the temperature that the regeneration is sufficient for completely reducing the stored nitrous oxide to nitrogen. The computed duration of regeneration is advantageously checked via measurement on the basis of an NOx sensor signal in the subsequent storage phase. In this embodiment, the NOx sensor serves to correct the computation parameters and thereby to adapt the computer module to the actual conditions which change, for example, because of deterioration.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
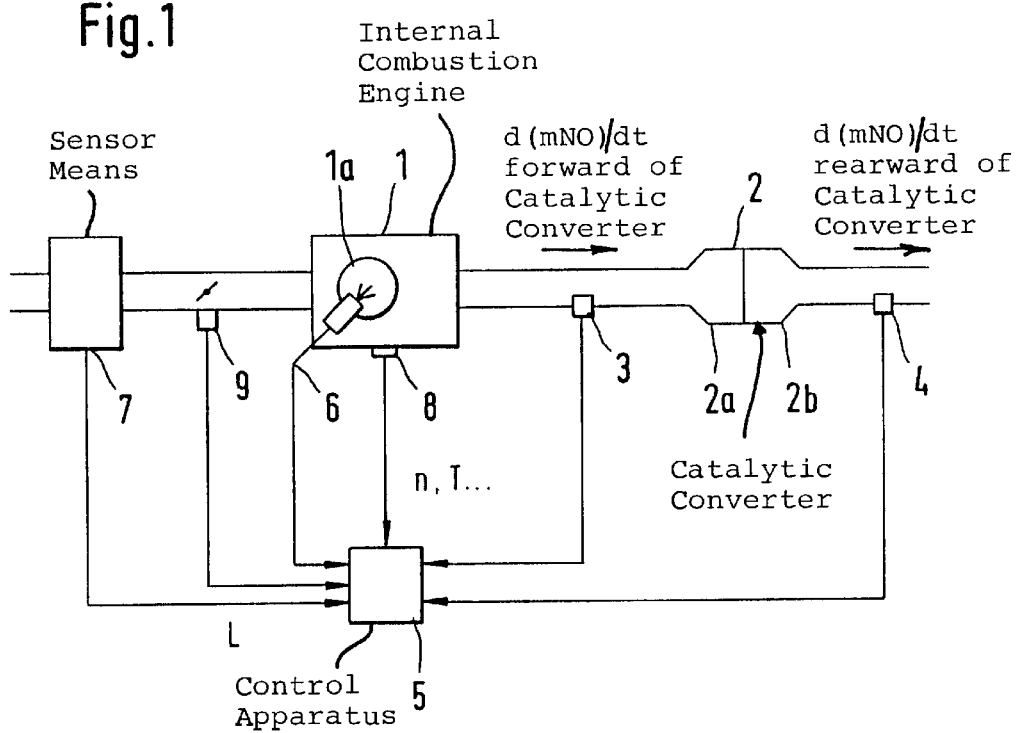
FIG. 1 shows the technical background in which the invention is applied and utilized.

FIG. 1 shows an internal combustion engine 1 having a catalytic converter 2, an exhaust-gas probe 3, an NOx sensor 4, a control apparatus 5, fuel-metering means 6 as well as various sensors 7, 8 and 9 for measuring load L and rpm n as well as further operating parameters of the engine as may be required such as temperatures, throttle flap position, et cetera.

From the above-mentioned and additional input signals, the control apparatus forms, inter alia, fuel-metering signals with which the fuel metering device 6 is driven. The fuel-metering device 6 can be configured for a so-called intake manifold injection as well as for a gasoline or diesel direct injection into the combustion chambers of the individual cylinders. The variation of the mixture composition can take place via a change of the injection pulsewidths with which the fuel-metering device is driven. In this context, the essence of the invention relates primarily to the coaction of the control apparatus 5 with the NOx sensor 4 mounted rearward of the catalytic converter.

Figure 2:
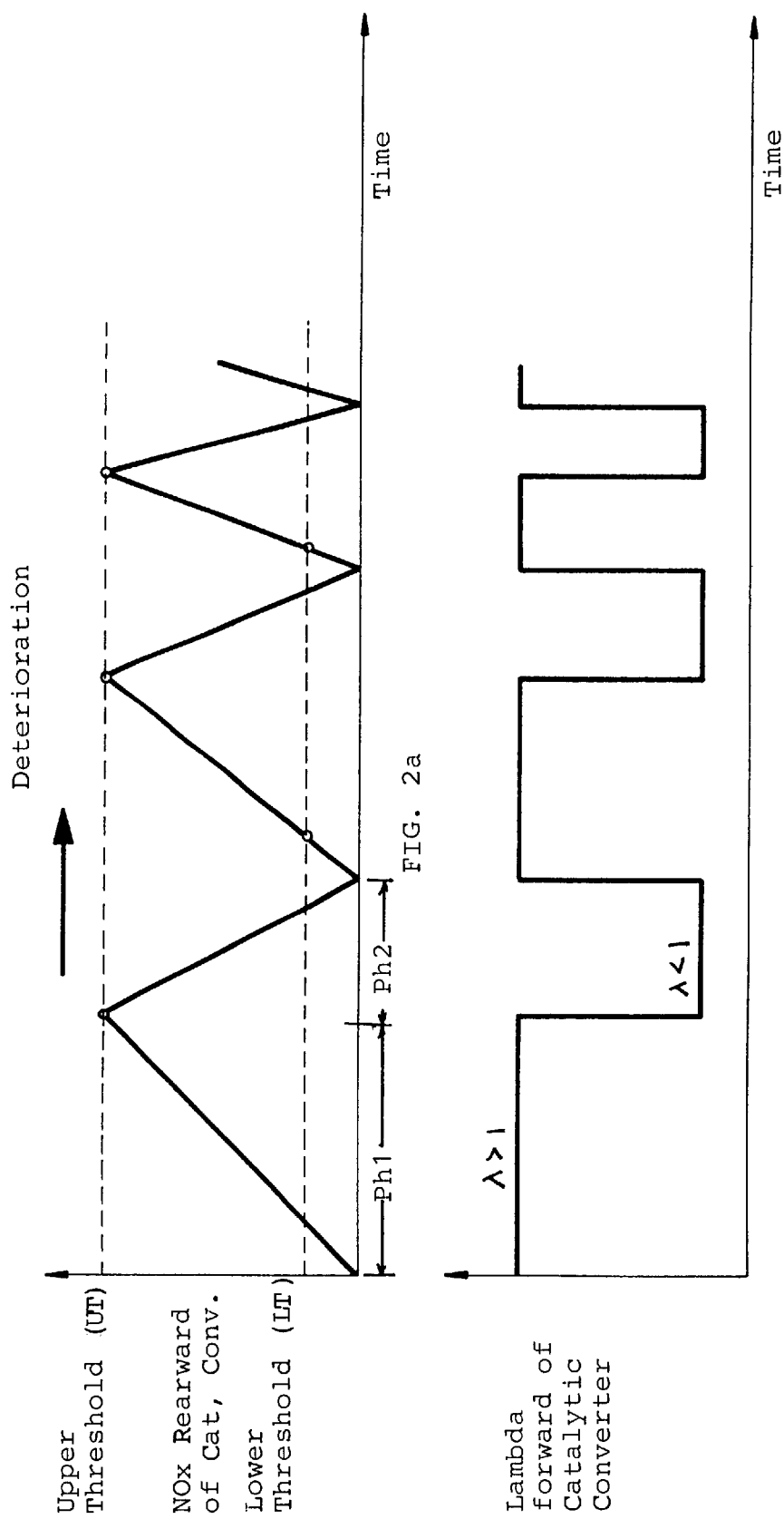
FIGS. 2a and 2b show the phase change with a showing of the signal performance of the NOx sensor rearward of the catalytic converter and the corresponding air/fuel ratio $\lambda$ as it is detected by the exhaust-gas sensor 3 mounted forward of the catalytic converter.

FIGS. 2a and 2b show the phase exchange with a showing of the signal performance of the NOx sensor 4 (FIG. 2a) mounted rearward of the catalytic converter and the corresponding air/fuel ratio $\lambda$ as it is detected by the exhaust-gas probe 3 (FIG. 2b) mounted forward of the catalytic converter.

At time point t=0, the NOx storage catalytic converter can be assumed to be empty. In the first phase Ph1, the engine is operated with a lean mixture ($\lambda$>1). This corresponds to step 3.1 in FIG. 3. The nitrous oxide, which is emitted thereby, is stored in the storage catalytic converter. The first phase (lean phase) is ideally ended when the storage catalytic converter 2a is full.

The storage catalytic converter is deemed to be full when the signal (S_NOx) of the NOx sensor reaches an upper threshold value UT. In this connection, reference can be made to step 3.2 of FIG. 3.

Figure 3:
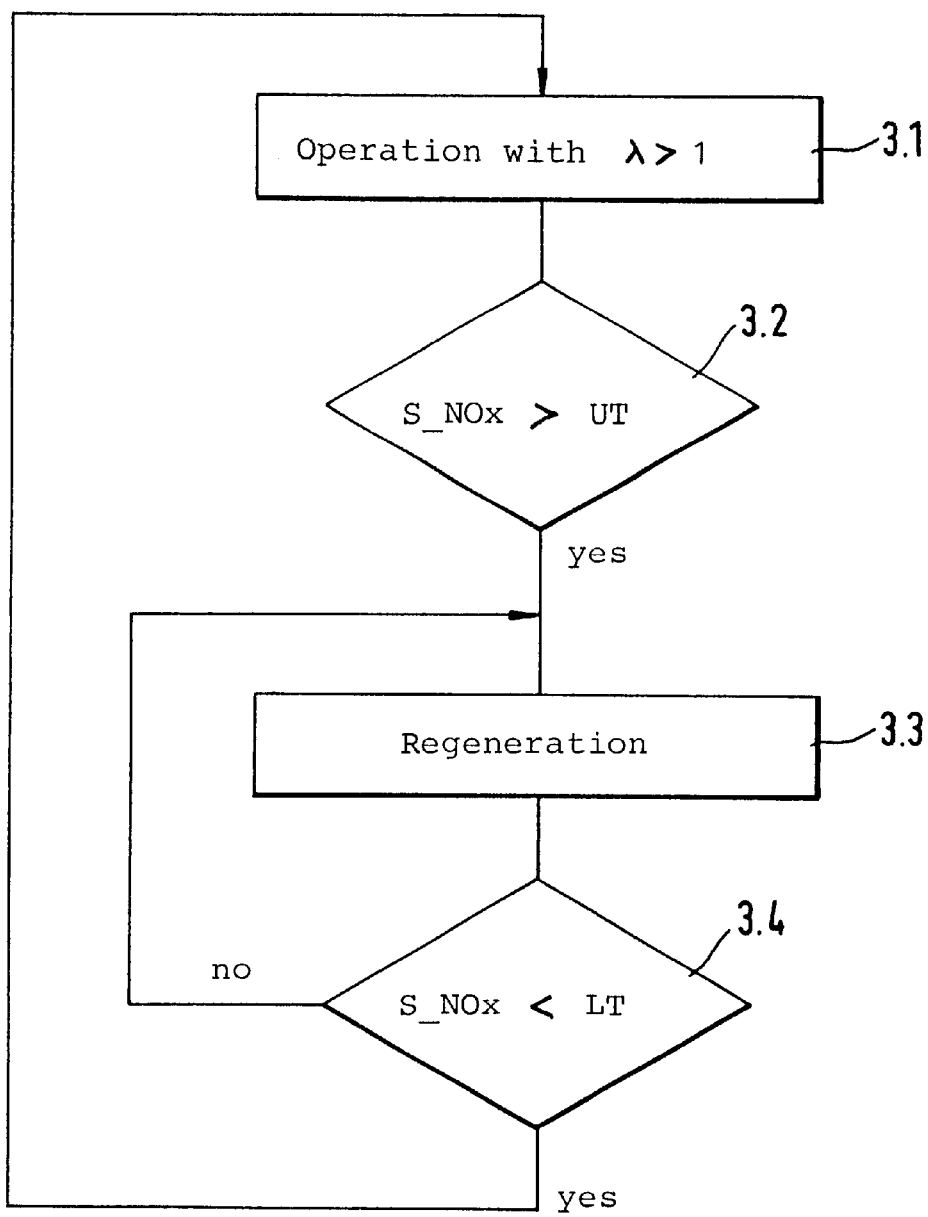
FIG. 3 is a flowchart showing a first embodiment of the method of the invention.

A second phase Ph2 follows the first phase and the storage catalytic converter is regenerated in the second phase which is represented by step 3.3 of FIG. 3. In this embodiment, the regeneration of the phase Ph2 takes place with an engine operation with a lambda value of less than 1. Here, the engine operating with a fuel-rich mixture emits uncombusted HC and CO as a reducing agent. Under the action of the catalytic converter, the reducing agent reacts with the stored nitrous oxides to form water, $CO_2$ and $N_2$ which are transported further with the exhaust gas. The storage is thereby again ready to take up nitrous oxide, that is, it is regenerated. The NOx content of the exhaust gas rearward of the storage catalytic converter reduces continuously during the regeneration. As soon as the signal of the NOx sensor reaches a lower threshold value LT, a transition takes place into the lean operation and a renewed storage of NOx in the storage catalytic converter. In this connection, reference can be made to step 3.4 of FIG. 3. The control apparatus 5 switches over in a continuous change between the phases Ph1 and Ph2.

The continuous increase and drop of the NOx concentration rearward of the storage catalytic converter is characteristic for known NOx storage catalytic converters. The rate of the NOx storage drops continuously with increasing level of charge so that the NOx concentrations in the exhaust gas, which can be measured rearward of the storage catalytic converter, increase with increasing level of charge. For this reason, the store must be regenerated relatively far ahead of its maximum charge level.

The rate of the NOx storage and the emptying of the storage by regeneration become greater with increasing operational deterioration of the storage catalytic converter. In this way, the storage and the regeneration times become shorter. This is shown symbolically in FIGS. 2a and 2b by a shortening of the period durations. Actually, the shortening takes place significantly slower. The positions of the upper and lower thresholds remain, in contrast, constant. The change of the storage characteristic, which is caused by deterioration, can be compensated by the control of the storage and regeneration phases in dependence upon reaching the above-mentioned threshold values.

Figure 4:
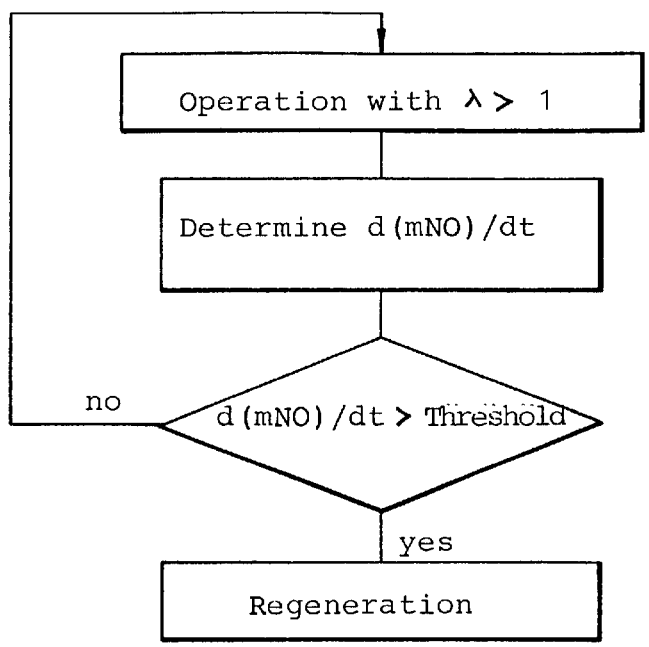
FIG. 4 is a flowchart showing another embodiment of the method of the invention.

In the second embodiment shown in FIG. 4, a change takes place on the basis of the NOx mass flow d(mNO)/dt rearward of the NOx storage catalytic converter. The NOx mass flow can be determined from the NOx sensor signal and the exhaust-gas mass which can be computed from the intake air quantity ml. For increasing the precision, the corresponding fuel mass can be considered. The intake air quantity forms a measure for the exhaust-gas mass flow. The signal of the NOx sensor supplies a measure for the NOx portion in the exhaust-gas flow rearward of the storage catalytic converter. The product of these two quantities defines the NOx mass flow at this location. If the NOx mass flow exceeds a pregiven threshold, the mixture enrichment for regeneration is triggered. This is shown in FIG. 4.

Figure 5:
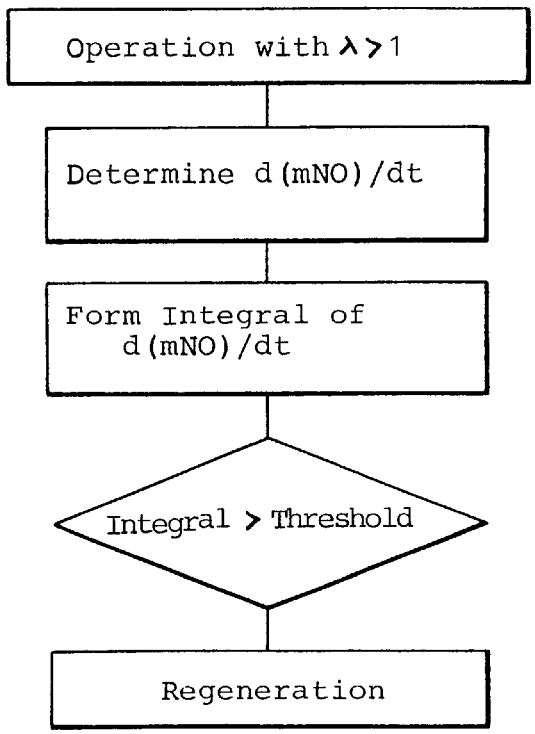
FIG. 5 is a flowchart showing another embodiment of the method of the invention.

Alternatively, a regeneration is triggered when the integral of the NOx mass flow since the end of the last regeneration phase exceeds a pregiven threshold value. This is based on the premise that the storage, which is still able to accommodate, only stores a certain fraction of the in-flowing NOx and that the complementary fraction flows through the storage catalytic converter without intermediate storage. When assuming a constant portion, the integral of the through-flowed NOx portion defines a measure for the portion stored in the catalytic converter. This embodiment is shown in FIG. 5.

A triggering on the basis of the integrated NOx concentration (integral ppm) is another alternative.

A conclusion as to the efficiency of the storage (that is, as to the degree of conversion q of the storage catalytic converter) can be drawn from the knowledge of the NOx mass flow d(mNO)/dt forward of the storage catalytic converter and the NOx mass flow d(mNO)/dt rearward of the catalytic converter. The level of conversion q can be defined as the difference of the NOx mass flow forward and rearward of the catalytic converter:

$$q=\{d(mNO)/dt)_{forw}-(d(mNO)/dt)_{rear}\}/(d(mNO)/dt)_{forw}$$

wherein this difference is normalized to the NOx mass flow forward of the catalytic converter.

Figure 6:
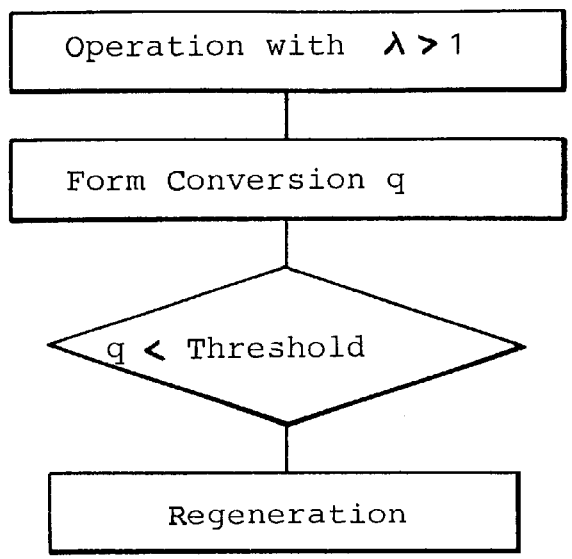
FIG. 6 is a flowchart showing still another embodiment of the method of the invention; and, FIG. 7 is a flowchart showing another embodiment of the method of the invention.

If the conversion level q drops below a predetermined threshold, a storage regeneration is initiated. In this connection, reference can be made to FIG. 6.

Figure 7:
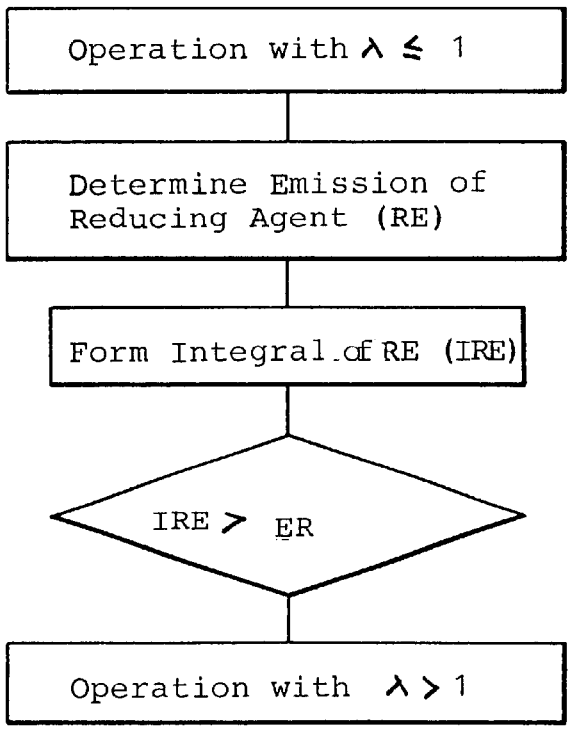

Referring to FIG. 7, the duration of the regeneration is advantageously computed as a function of the supplied quantity of reducing agent and the temperature so that it is sufficient for the complete reduction of the stored nitrous oxides to nitrogen. In a known NOx charge of the catalytic converter, the duration of the regeneration can be computed.

For this purpose, the temperature of the catalytic converter is computed from the exhaust-gas temperature and the intake air mass flow. Furthermore, a determination of the reduction agent emissions RE from the engine takes place, for example, from a load/rpm characteristic field or from the intake-air flow and from the lambda value of the exhaust gas detected forward of the storage catalytic converter. In this way, the regeneration phase is carried out with model support so that the quantity IRE can be computed, that is, the integral over time of the supplied reducing agent (RE) in dependence upon the intake air quantity and the lambda value ($\lambda \leq 1$). The reducing agent quantity is summed until the summed quantity corresponds to the expected requirement ER for regenerating the storage. Then there is again a switchover to the lean phase (see FIG. 7).

In this embodiment, the NOx sensor, which is mounted rearward of the storage catalytic converter, makes possible the support and the control of the open-loop control based on the model.

Stated otherwise, the computed regeneration duration is checked with the aid of measurements on the basis of the NOx sensor signal in the next-following storage phase. For this purpose, the NOx sensor signal is evaluated after an executed regeneration in the next-following lean operation. If this signal already exceeds a threshold at the start of the lean operation, the regeneration was too short. Correspondingly, the next regeneration phase can be lengthened. The NOx sensor serves in this embodiment for correcting the computation parameters and therefore to the adaptation of the computation model to the actual conditions which can change, for example, because of deterioration.

The invention is not limited to a rich control of the engine for making HC and CO available in the exhaust gas as a reduction agent. The reduction agent can also be metered in a controlled manner from other sources such as urea from a supply tank.

It is understood that the foregoing description is that of the preferred embodiments of the invention and that various changes and modifications may be made thereto without departing from the spirit and scope of the invention as defined in the appended claims.

What is claimed is:

1. A method for changing the mixture composition of the exhaust gas supplied from a combustion process to a NOx storage catalytic converter, the method comprising the steps of:

providing an NOx sensor mounted rearward of said NOx storage viewed in flow direction;

changing said exhaust gas composition in a first phase so as to cause said exhaust gas to contain more NOx than in a second phase;

forming an ancillary signal by considering the signal of said NOx sensor and said ancillary signal defining the degree of conversion (q) of said NOx storage catalytic converter;

changing said exhaust gas composition in said second phase so as to cause said exhaust gas to contain a reducing agent;

changing over from the first phase into said second phase when said degree of conversion (q) drops below a threshold; and, wherein said degree of conversion is given by $$q=\{(d(mNO)/dt)_{forw}-(d(mNO)/dt)_{rear}\}/(d(mNO)/dt)_{forw}$$

where: d(mNO)/dt is the NOx mass flow forward of said NOx storage catalytic converter and d(mNO)/dt is the NOx mass flow rearward of said NOx storage catalytic converter.

2. An electronic control arrangement for changing the composition of an exhaust gas which is supplied to a NOx storage catalytic converter from a combustion process in an internal combustion engine, the arrangement comprising:

a control apparatus;

an NOx sensor connected to said control apparatus;

means for forming an ancillary signal by considering the signal of said NOx sensor which ancillary signal defines the degree of conversion (q) of said NOx storage catalytic converter;

a plurality of sensors connected to said control apparatus for providing sensor signals representative of load (L) and engine rpm (n) to said control apparatus;

fuel-metering means for metering fuel to said engine;

said control apparatus functioning to form fuel-metering signals from said signals of said sensors for driving said fuel-metering means for causing: said combustion process to alternately take place in a first phase with a mixture which is fuel lean compared to the stoichiometric mixture composition and in a second phase with a mixture composition which is stoichiometric or fuel rich; and, to change from the first phase to the second phase when said degree of conversion (q) of said catalytic converter drops below a threshold; and, wherein said degree of conversion is given by $$q=\{(d(mNO)/dt)_{forw}-(d(mNO)/dt)_{rear}\}/(d(mNO)/dt)_{forw}$$

where: d(mNO)/dt is the NOx mass flow forward of said NOx storage catalytic converter and d(mNO)/dt is the NOx mass flow rearward of said NOx storage catalytic converter.

* * * * *